United States Patent [19]

Lenhart

[11] Patent Number: 4,721,419
[45] Date of Patent: Jan. 26, 1988

[54] CONTAINER NESTING APPARATUS
[75] Inventor: Ronald A. Lenhart, Lakewood, Colo.
[73] Assignee: Precision Metal Fabricators, Inc., Arvada, Colo.
[21] Appl. No.: 871,808
[22] Filed: Jun. 9, 1986
[51] Int. Cl.⁴ ............................................. B65G 51/00
[52] U.S. Cl. .................................................... 406/88
[58] Field of Search ...................... 406/86, 88; 198/453
[56] References Cited

U.S. PATENT DOCUMENTS 3,999,806 12/1976 Hurd .................................... 406/88
4,462,720 7/1984 Lenhart ............................... 406/88
4,561,806 12/1985 Lenhart ............................... 406/88

FOREIGN PATENT DOCUMENTS 2040471 2/1972 Fed. Rep. of Germany ...... 198/453

Primary Examiner—Jeffrey V. Nase
Assistant Examiner—Lynn M. Fiorito
Attorney, Agent, or Firm—Fields, Lewis, Pittenger & Rost

[57] ABSTRACT

A nesting table is provided which receives containers en masse from a mass air conveyor at an upstream end and discharges the containers onto a deadplate in three rows in contiguous equilateral configuration. In one embodiment, a high air pressure zone is provided along the nesting table by means of a cover extending from one side across the table to a point spaced at least one container diameter from the opposite side so that the containers entering the nesting table form two longitudinal rows on opposite sides and fill in between with a third row which nests with the row of containers which is not under the cover. A kicker plate is provided downstream of the cover to move the three formed rows of containers into nesting contiguous equilateral configuration for movement onto a deadplate. In a second embodiment, the cover is spaced at least two container diameters from the opposite edge and tapered side guides converge the three rows of containers. A third embodiment is like the second but has a second cover extending from the opposite edge to a point spaced from the first cover to form a slot for escape of air. A fourth embodiment has a cover extending across the entire table with converging downstream edges which come to a point. A row of containers is formed along each edge and a third row beyond the pointed end.

12 Claims, 15 Drawing Figures

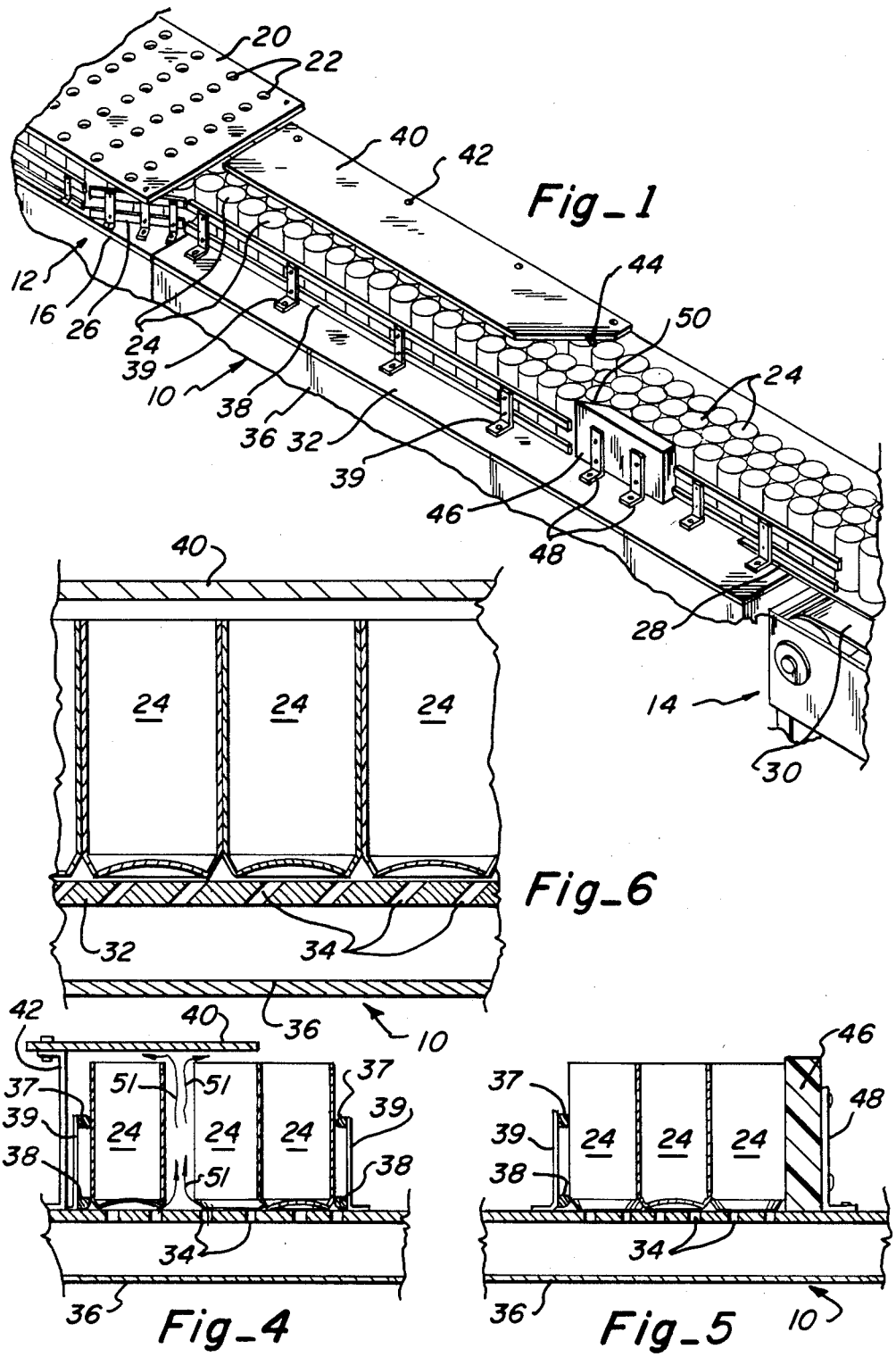

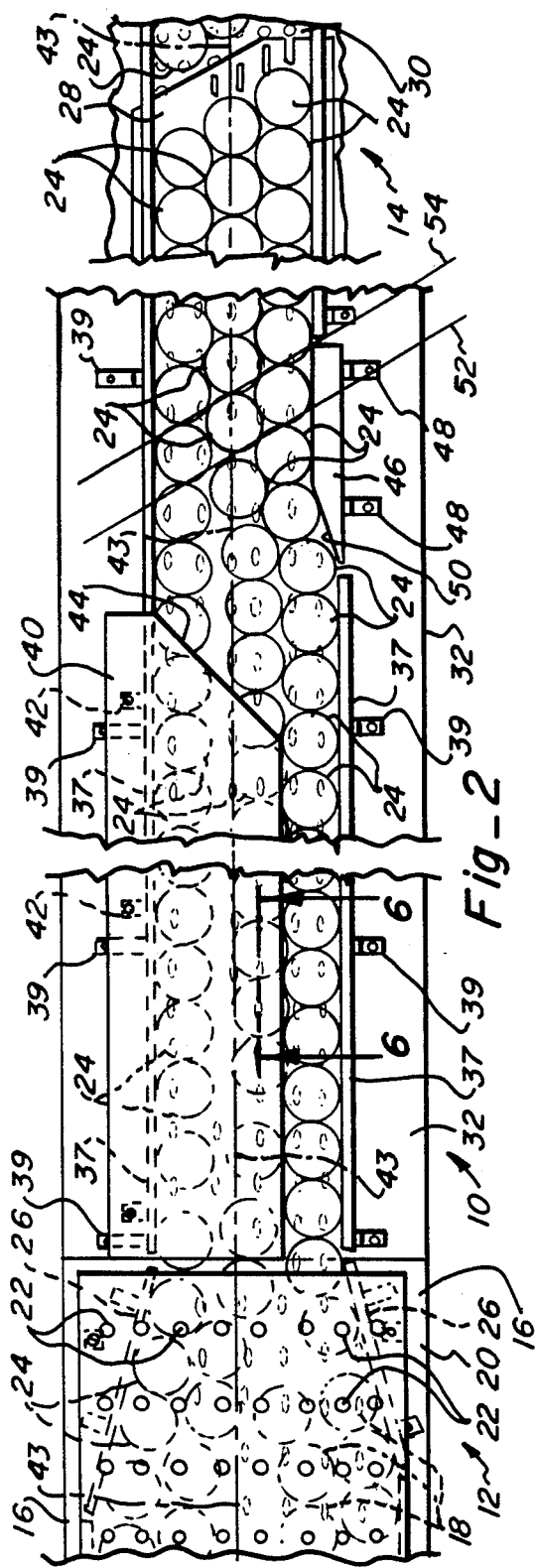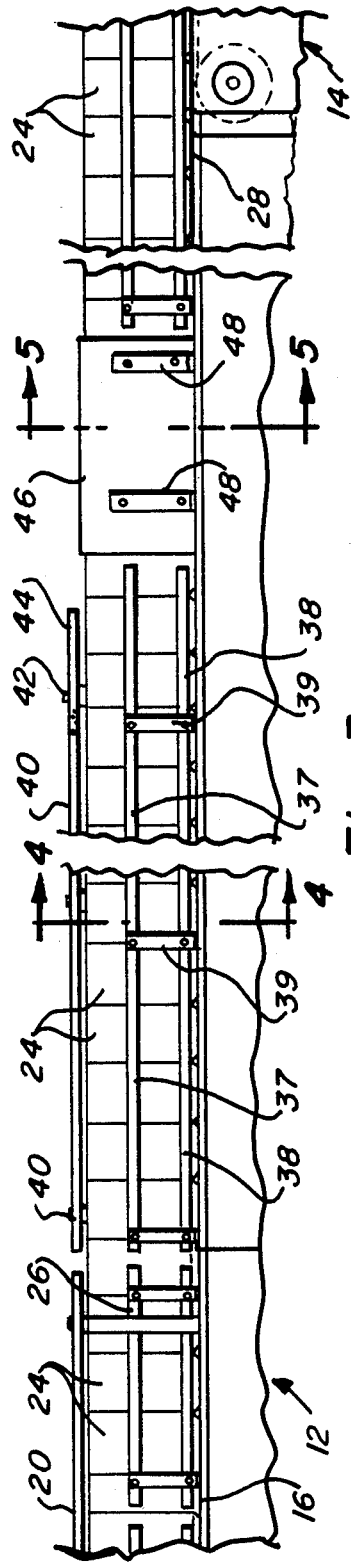

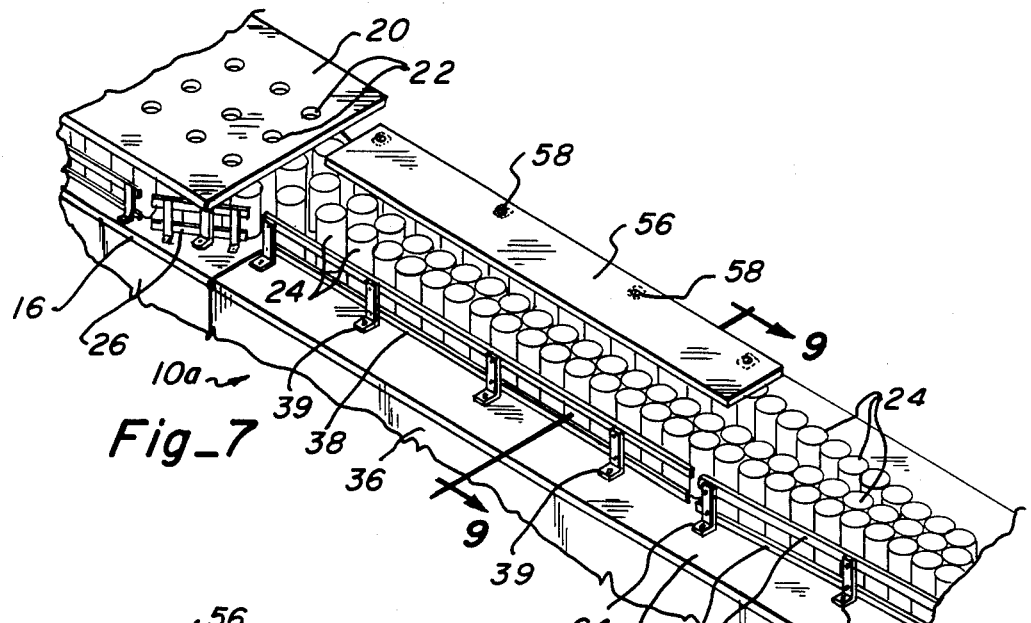
Fig_7
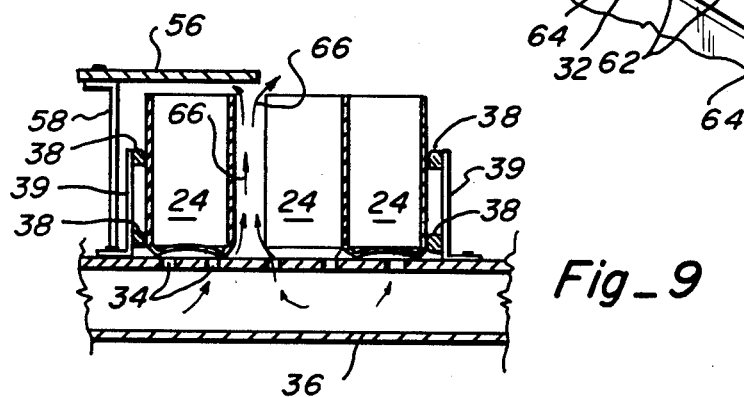
Fig_9
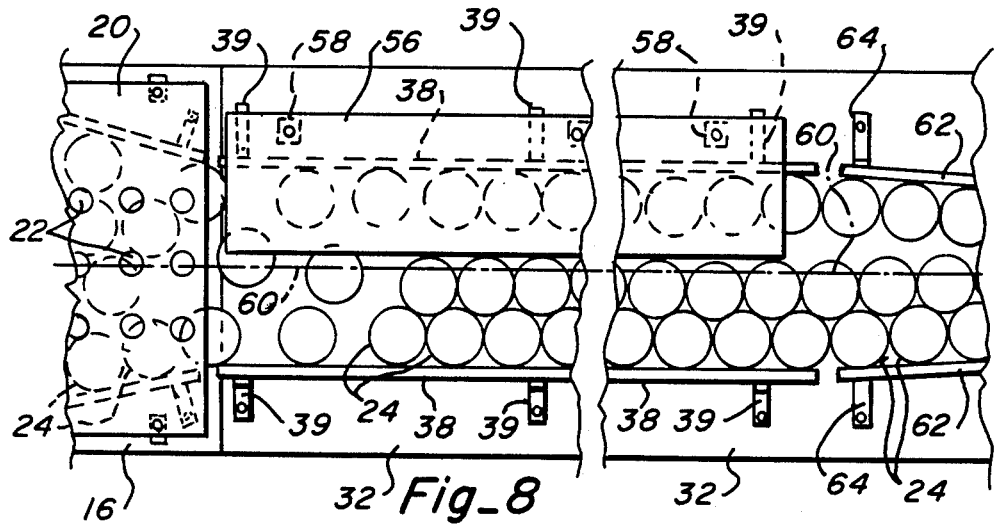
Fig_8

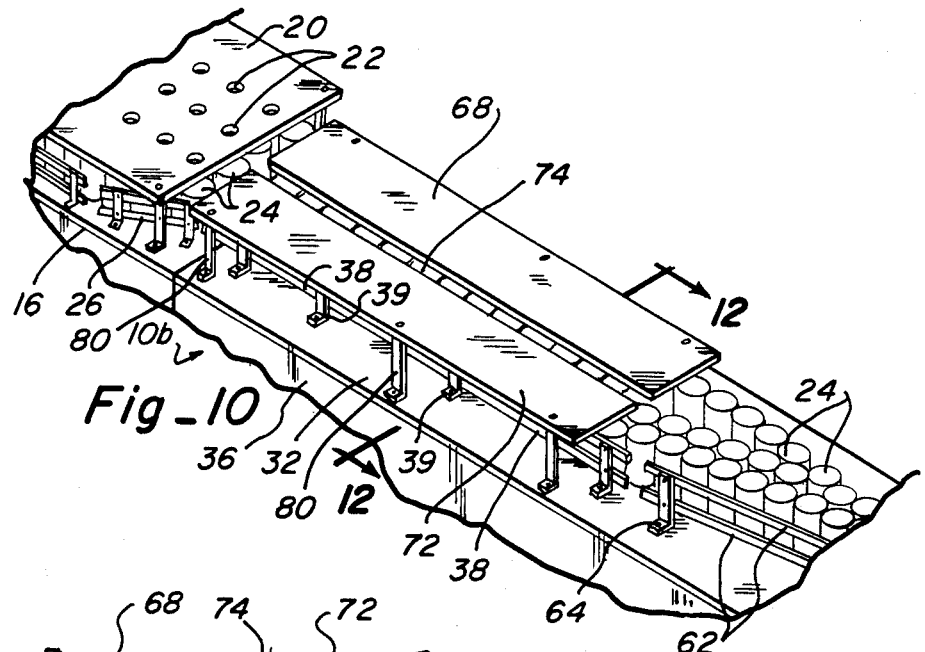
Fig_10
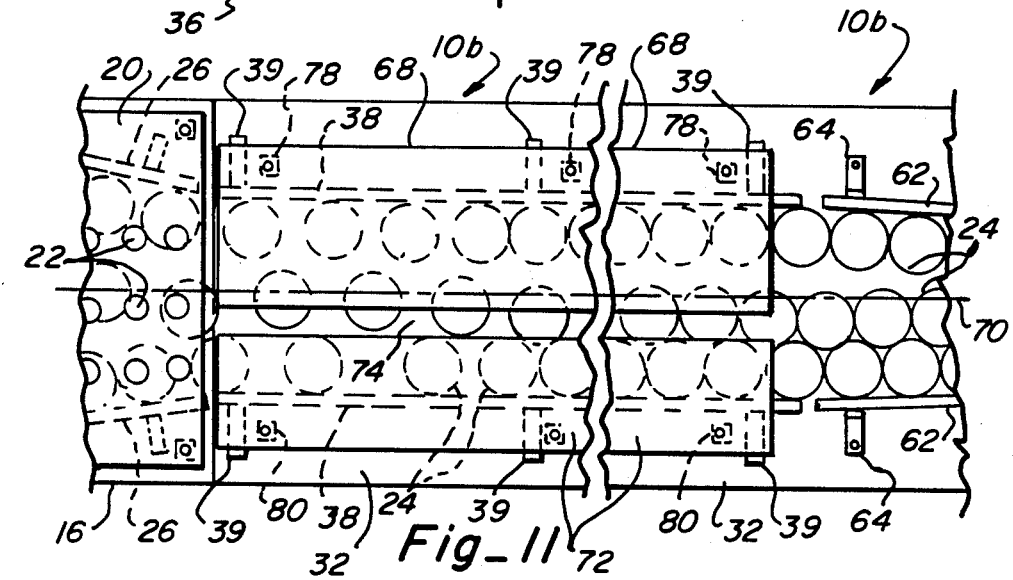
Fig_12
Fig_11

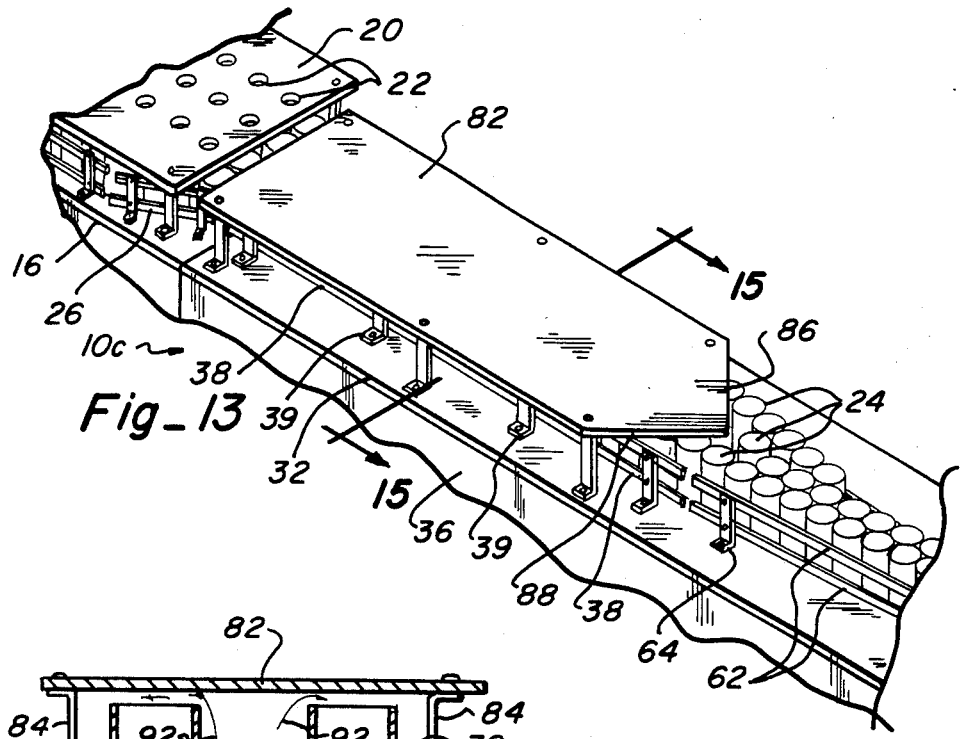
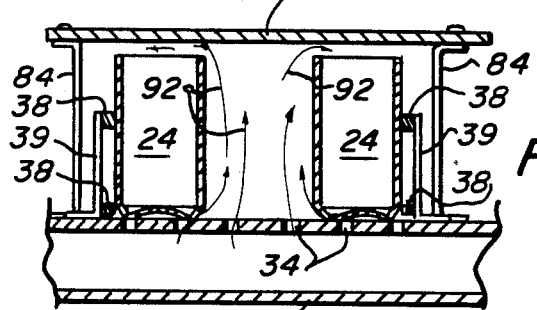
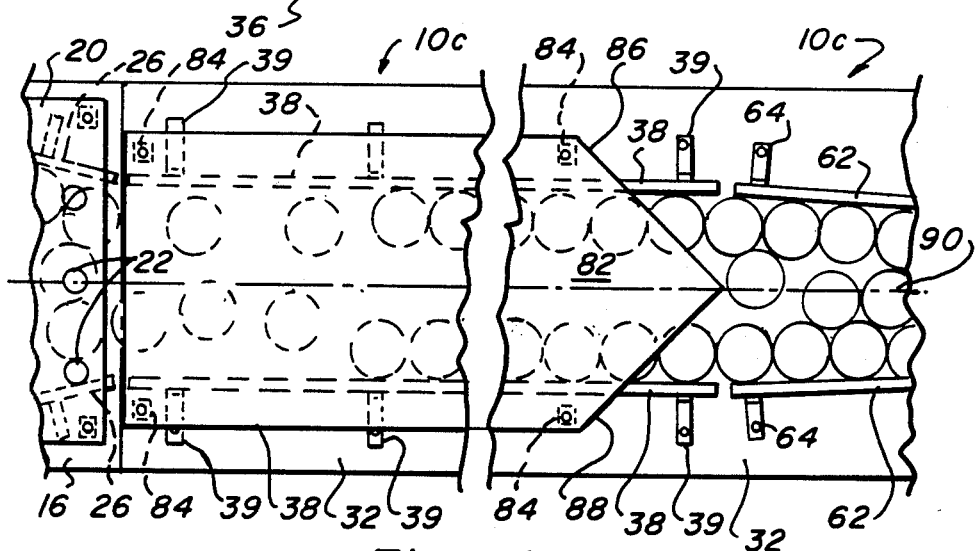

CONTAINER NESTING APPARATUS

TECHNICAL FIELD

This invention relates to the conveying of containers from a mass air conveyor to a single filer. More particularly, the invention relates to a device for handling cylindrical articles by air and arranging them in a predetermined nesting pattern to facilitate placing them in single file.

BACKGROUND ART

A vacuum single filer is disclosed in my copending U.S. patent application Ser. No. 700,748, entitled "Vacuum Single Filer" which was filed Feb. 12, 1985. Cylindrical articles, such as beverage containers are arranged in three rows in contiguous equilateral triangular configuration on a deadplate. The articles are pushed off the deadplate onto a moving belt under which vacuum is drawn to hold the containers in the arrangement in which they are moved off the deadplate. Because of the equilateral triangular configuration, the containers move off the deadplate in a diagonal row with the outermost container furthest forward. The containers are then brought into single file alignment by a deflector which moves the trailing containers into position behind the leading container.

However, if the containers are not in contiguous equilateral configuration as they leave the deadplate, they may become improperly aligned on the vacuum belt so that the leading container is deflected outwardly by the trailing containers to such an extent that it cannot be brought into single file arrangement with the other containers and is discharged over the side of the belt for recycling. It has been found that whenever the containers are out of the contiguous equilateral configuration, the exact positioning of the containers as they leave the deadplate is quite variable and unpredictable resulting in the apparatus not operating at full efficiency.

In single filers in which the containers are supported by air, the bridging of the containers as they are broken down from a mass configuration to single file is a serious problem. Such bridging will stop the flow of containers until the condition can be corrected. Thus, the efficiency and productivity of the system is impaired.

DISCLOSURE OF THE INVENTION

In accordance with this invention, an apparatus is provided for nesting cylindrical articles which are conveyed en masse from a first upstream location to a second downstream location in a three-row width having equilateral triangular configuration in which all articles are contiguous. The apparatus comprises a nesting table extending from the upstream location to the downstream location and has a surface, parallel side edges and an underside with a prearranged pattern of flotation air jets in the surface slanted in a downstream direction and communicating the surface and the underside of the table, the side edges being spaced apart a distance which is greater than three article diameters and is less than four article diameters. The plenum is connectable to a source of air under pressure and attached to the underside of the table surface. An imperforate cover is spaced above the nesting table a distance slightly greater than the height of the articles and extends longitudinally from the upstream location to a point which is upstream from the downstream location to create a high pressure area under the cover which forms at least a first row of articles along the one side and a second row of articles along the other side. A third row of articles fills in between the other two and nests with the one of the others where the air pressure is less. Means is provided above one of the edges located downstream of the cover for converging the articles into nesting contiguous equilateral triangular configuration prior to being broken down into single file alignment.

More particularly, in one embodiment the converging means includes a kicker plate along one side edge having an upstream tapered edge which forces the articles laterally into nesting contiguous equilateral configuration as they move toward a deadplate. The cover extends laterally from one of the side edges toward the other side edge and is spaced from the other side edge a distance approximately equal to one article diameter. The downstream end of the cover is truncated diagonally across the nesting table and has a downstream corner which is closest to the side edge against which the articles are converged into nesting relationship by the kicker plate. The kicker plate can be along the side edge opposite the side edge from which the imperforate cover extends. Upper and lower guide rails are provided along each side edge with the lower guide rail lying substantially along the surface of the nesting table. The area between the guide rails is substantially open to allow escape of air from the nesting table. With this arrangement, it can be seen that by forming rows of articles on opposite sides of the nesting table and allowing a third row to fill in the center, which third row is urged toward one of the other two rows into nesting relationship, it will be assured that three rows of articles will always be available at the deadplate and there will be no gaps caused by missing articles due to bridging or jamming upstream of the deadplate. This will permit three rows of articles to be continuously brought onto the deadplate and discharged therefrom in a predictable arrangement so that they can be properly handled by the single filer to bring them into single file alignment.

In an alternative embodiment, the imperforate cover extends from one side edge toward the other side edge and is spaced from the other side edge a distance equal to approximately two article diameters. Using this cover, one row of articles forms along the side rail under the cover and two rows of articles are formed in the uncovered area with one row being against the other side rail and the third row being adjacent this second row. Instead of using a kicker plate, the downstream guide rails can converge the first row into nesting relationship with the other two rows to form the equilateral triangular configuration of the articles as they are moved onto the deadplate.

In a third embodiment, two imperforate covers may be used wherein one imperforate cover extends from one guide rail approximately two article diameters toward the second rail and the second imperforate cover extends in from the second guide rail approximately one article diameter with a longitudinal slot formed between the two covers. With this arrangement, the high pressure areas cause one row of articles to be formed along the side rail under the wider imperforate cover and a second row to be formed along the guide rail under the narrow imperforate cover. A third row of articles is formed adjacent to and in nesting relationship to the articles under the narrow cover and below the slot. Again, the rows of articles can be merged into nesting relationship by converging side rails.

A still further embodiment can include a completely solid imperforate cover wherein the downstream end tapers to a point at the center of the table between the side rails. In this embodiment, the high pressure created by the imperforate cover causes the articles to be arranged into two rows, one row along each guide rail with the center substantially open. However, at the downstream end of the cover where the end converges to a point, articles will begin to move toward the center and will fill in with a third row as the articles move between converging guide rails to bring the three formed rows of articles into nesting equilateral contiguous relationship for movement onto the deadplate.

Additional advantages of the invention will become apparent from the description which follows, taken in conjunction with the accompanying drawings.

BRIEF DESCRIPTION OF THE DRAWINGS

FIG. 1 is a perspective view of one embodiment of the nesting table of this invention;

FIG. 2 is an enlarged fragmentary top plan view of the nesting table of FIG. 1;

FIG. 3 is a fragmentary, side elevation of the nesting table of FIG. 2;

FIG. 4 is an enlarged vertical section, taken along 4—4 of FIG. 3, showing the arrangement of the rows of containers on the nesting table;

FIG. 5 is an enlarged vertical section taken along line 5—5 of FIG. 3, showing the arrangement of the containers as they pass the kicker plate;

FIG. 6 is an enlarged horizontal section, taken along line 6—6 of FIG. 2, showing the arrangement of the air jets through the nesting table;

FIG. 7 is a perspective view, similar to FIG. 1 but showing an alternative imperforate top cover;

FIG. 8 is an enlarged fragmentary plan view of the air table of FIG. 7 showing the movement of the containers;

FIG. 9 is an enlarged horizontal section, taken along line 9—9 of FIG. 7, showing the flow of air between the containers;

FIG. 10 is a perspective view similar to FIGS. 1 and 7, showing a still further alternative embodiment utilizing two imperforate covers;

FIG. 11 is an enlarged fragmentary plan view of the air table of FIG. 10, showing the movement of the containers;

FIG. 12 is a horizontal section, taken along line 12—12 of FIG. 10, showing the flow of air between the containers;

FIG. 13 is a perspective view similar to FIGS. 1, 7 and 10 but showing a still further alternative embodiment of an imperforate cover;

FIG. 14 is an enlarged fragmentary top plan view of the air table of FIG. 13, showing the movement of the containers; and FIG. 15 is a horizontal section, taken along line 15—15 of FIG. 13, showing the arrangement of the containers and the air flow under the imperforate cover.

BEST MODE FOR CARRYING OUT THE INVENTION

In accordance with one form of this invention, a nesting table 10 is provided, as shown in FIG. 1, which receives containers from a mass air conveyor 12 at the upstream end and discharges them onto a single filer, such as vacuum single filer 14 at the downstream end. As will be fully described below, the nesting table 10 serves the function of breaking the containers down into three rows of containers which are brought into nesting contiguous relationship to form an equilateral triangular configuration. It is important to have the containers in this configuration before they move onto the deadplate of the vacuum single filer so that the relationship between adjacent containers is always the same. This assures that the containers move from the deadplate onto the single filer in a predictable and regular pattern so that they always can be brought into single file alignment.

Mass air conveyor 12 includes a table 16 having a plurality of air jet openings 18, as best seen in FIG. 2. A cover 20 is provided over the table 16, which cover has spaced perforations 22. With this arrangement, the mass of containers 24 are dispersed across table 16 and move smoothly toward nesting table 10. The operation of this air table can be more fully understood by reference to my U.S. Pat. No. 4,456,406 for "Air Table System". Converging spaced side rails 26 direct the containers 24 to the upstream end of nesting table 10.

At the downstream end of nesting table 10 is a deadplate 28 across which containers 24 are pushed by the upstream containers. The arrangement of the containers as they reach the downstream end of the deadplate must be in contiguous equilateral triangular configuration as best seen at the right hand end of FIG. 2. From the deadplate, the containers move onto endless belt 30 of vacuum single filer 14 in diagonal rows which are arranged into single file configuration as shown in my above-mentioned copending U.S. patent application Ser. No. 700,748.

Nesting table 10 includes a table surface 32 for supporting the containers which has a prearranged pattern of flotation air jets 34, as best seen in FIG. 6, for supporting the containers and moving them from the upstream end to the downstream end. The air jets communicate with plenum 36, table surface 32 forming the top wall thereof. Open guide rails are defined on opposite sides of the table by upper and lower guides 37 and 38, respectively, for guiding the containers. These guides are supported by spaced brackets 39. The lower guide 38 rests on table surface 32. The guide rails on each side of the nesting table are spaced laterally a distance which is greater than three container diameters and less than four container diameters for a purpose to be described.

An imperforate cover 40 is supported along one side by spaced brackets 42 and extends from the upstream end of the nesting table toward the downstream end and extends laterally a distance which is greater than two container diameters and preferably is spaced from the opposite side edge a distance equal to one container diameter. The cover creates a high pressure area thereunder which is offset from centerline 43 of the table. Air issuing from flotation jets 34 causes the containers as they enter the nesting table to form single file rows along each side rail. This occurs because the air pressure under imperforate cover 40 is higher than in the uncovered areas and the air escapes by passing through the spaced side rails and the uncovered area over the nesting table. The space between the two rows of containers is filled by additional containers forming a third row in the center. This center row is moved by the higher air pressure under cover 40 into nesting relationship with the uncovered row of containers. This arrangement avoids bridging across the air table and allows the containers to completely fill into a three container wide configuration at the downstream end of the nesting table. The downstream end of cover 40 has a diagonal edge 44 which relieves the high pressure downstream of the cover 40.

Further downstream of cover 40 is a kicker plate 46 which is supported by a pair of spaced brackets 48 adjacent the downstream end of the side rails 38 along one side of table 16. The upstream end of kicker plate 46 has a bevelled edge 50 which deflects the containers, as they move downstream, toward the row of containers on the opposite side of the nesting plate. This brings the three rows of containers into nesting contiguous equilateral configuration as they move from the nesting table onto deadplate 28. The kicker plate 46 could be along either side rail but is preferably on the side opposite the cover 40. With the cover extending laterally across the nesting table from one side to a position spaced one container diameter from the other side, the center row of containers will always be urged toward and into nesting relationship with the row of containers which is not under the cover. Because of the location of the high pressure area to one side of centerline 43, the containers entering the center of the nesting table will go toward the low pressure on the other side of centerline 43. The flow of air is shown by arrows 51 of FIG. 4. With this arrangement, there cannot be any jamming and the containers will be in a predetermined arrangement as they move past kicker plate 46 to bring them into the nesting equilateral contiguous configuration desired on the deadplate. The containers then move from the deadplate onto the single filer conveyor belt 30. As best seen by viewing FIG. 2, the aligned containers form uniform diagonal rows as defined by lines 52 and 54.

An alternative nesting table 10a is shown in FIGS. 7-9. In this nesting table a much narrower imperforate cover 56 is provided which is mounted on brackets 58 along one side of the table. As best seen in FIG. 8, cover 56 extends laterally to a position just short of centerline 60 and thus is slightly more than one container diameter in width. With this arrangement, a high pressure area will be created under imperforate cover 56 which will cause one row of containers to form along guide rails 38 under cover 56 and another row to form along the opposite guide rails. A third row will fill in between the other two rows and will move toward and into nesting relationship with the row of containers which are uncovered. The flow of air is best illustrated in FIG. 9 by arrows 66.

A further embodiment is shown in FIGS. 10-12 wherein two imperforate covers are provided over table 10b. A wide cover 68 is provided which extends from one side edge across the table 10a a distance equal to approximately two container diameters and past the centerline 70, shown in FIG. 11. A second narrow cover 72 is provided which extends inwardly from the opposite side rail of table 10b for a distance of approximately one container diameter, the adjacent edges of the two covers forming a slot 74 through which air can escape, as shown by arrows 76 in FIG. 12. Conveniently, wide cover 68 is held in position by spaced supports 78 and narrow cover 72 is held in position by spaced supports 80. By this arrangement, it will be seen that containers will form along each open side rail due to the greater air pressure created under the imperforate covers and that air can escape through slot 74 so that a third row of containers moves into nesting relationship against the row of containers under the narrow cover 72. After leaving the covers the separate row of containers will be merged into nesting relationship with the other two rows of containers, as previously described in connection with the other embodiments.

A still further embodiment is shown in FIGS. 13-15 wherein a nesting table 10c is provided having an imperforate top cover 82 which extends entirely across the table from one side guide rail 38 to the guide rails 38 on the opposite side and is mounted on supports 84 located outwardly of the guide rails, as shown. The cover 82 at its downstream end has converging edges 86 and 88 which come to a point along centerline 90. With this arrangement a high pressure area is created throughout the air table under cover 82 so that containers move laterally to the open side guide rails 38 forming a row of containers along each guide rail. However, as the containers move beyond the converging edges 86 and 88 some of the containers will be forced to the center to form a third row whereupon the three rows are brought into nesting contiguous relationship by converging guide rails 62, as previously described. The flow of air is shown in FIG. 15 by arrows 92.

The advantages of this invention are readily apparent. A nesting table has been provided in several embodiments which will receive containers at an upstream end from a mass air conveyor and arrange them in three rows which are merged into nesting equilateral configuration at a downstream end. These nested containers are supplied to a deadplate at a vacuum single filer. Thus, it is assured that there is no bridging between the containers and that a full compliment or supply of containers is always supplied at the deadplate as needed.

In one embodiment, a single imperforate cover is provided which extends from one side edge to a point spaced approximatley one container diameter from the opposite edge to create a high pressure area forming two rows of nested containers along the open side and one row of containers along the covered side which are merged into nesting relationship beyond the cover by a kicker plate.

In another embodiment, a narrow imperforate cover extends from one side edge a distance slightly greater than one container diameter but not reaching the centerline of the nesting table. The high pressure created by the imperforate cover causes one row of containers to be formed under the cover adjacent the guide rail under the cover and two rows of nested containers to be formed along the opposite uncovered guide rail. These containers are merged beyond the imperforate cover by converging side guide rails into nested equilateral triangular configuration.

Still another embodiment utilizes both a wide imperforate cover and a narrow imperforate cover wherein the wide imperforate cover extends from one side guide to a point beyond the centerline of the nesting table and the other cover extends from the other side guide for a distance approxiamtely equal to one container diameter so that a slot is formed between the adjacent edges of the covers. With this arrangement, a single row of containers is formed along the guide rail under the wide cover and two nested rows of containers are formed along the guide rail under the narrow cover and the slot. These rows of containers are merged by converging guide rails into nested equilateral triangular configuration.

A further embodiment utilizes a solid cover which extends entirely across the nesting table from one guide rail to the opposite guide rail and has converging edges at the downstream end which come to a point over the centerline of the nesting table. With this arrangement, a single row of containers is formed along each guide rail under the cover and as the containers move beyond the converging edges of the cover some of the containers move into the center to form a third row between converging guide rails that bring the containers into nested equilateral triangular configuration.

This invention has been described in detail with reference to particular embodiments thereof, but it will be understood that various other modifications can be effected within the spirit and scope of this invention.

What is claimed is:

1. Air operated handling apparatus for nesting cylindrical articles which are conveyed en mass from a first upsteam location to a second downstream location in a three row width having an equilateral triangular configuration in which all articles are contiguous, said apparatus comprising:
    a nesting table extending from said upstream location to said downstream location and having a surface, two parallel side edges and an underside with a prearranged pattern of flotation air jets in said surface slanted in a downstream direction and communicating said surface and said underside of said table, said side edges being spaced apart a distance which is greater than three articles diameters;
    a plenum connectable to a source of air under pressure and attached to the underside of said table surface;
    spaced side guides along each side edge through which air from the air jets can escape;
    an imperforate cover spaced above said nesting table a distance slightly greater than the height of said articles and extending longitudinally from said upstream location to a point which is upstream from said downstream location and extending across a portion of said table so that a high pressure area is created under said cover which forms a first row of articles along one of said side edges, a second row of articles along the other of said side edges and a third row of articles in the space between the first and second row of articles, the third row of articles being urged toward the second row of articles into nesting relationship by the high pressure, wherein said cover extends laterally from one of said side edges toward the other of said side edges and is spaced from said other side edge a distance approximately equal to one article diameter; and
    means located downstream of said cover and upstream of said downstream location for converging and holding the articles in a contiguous nesting equilateral triangular configuration at said downstream location.

2. Apparatus, as claimed in claim 1, wherein said means for converging includes:
    a kicker plate along one of side edges having an upstream tapered edge which forces the articles laterally into nesting contiguous equilateral configuration as they move toward said downstream location.

3. Apparatus, as claimed in claim 2, wherein:
    the downstream end of said cover extends diagonally across said nesting table having a downstream corner which is closest to the side edge against which the articles are being converged by said kicker plate.

4. Apparatus, as claimed in claim 2, wherein:
    said kicker plate is along said other of said side edges.

5. Apparatus, as claimed in claim 1, further including:
    guide rails along each side edge having spaced upper and lower guides, said lower guide lying substantially along said surface, said apparatus being substantially open between said upper and lower guide.

6. Air operated handling apparatus for nesting cylindrical articles which are conveyed en mass from a first upstream location to a second downstream location in a three row width having an equilateral triangular configuration in which all articles are contiguous, said apparatus comprising:
    a nesting table extending from said upstream location to said downstream location and having a surface, two parallel side edges and an underside with a preaaranged pattern of flotation air jets in said surface slanted in a downstream direction and communicating said surface and said underside of said table, said side edges being spaced apart a distance which is greater than three articles diameters;
    a plenum connectable to a source of air under pressure and attached to the underside of said table surface;
    spaced side guides along each side edge through which air from the air jets can escape;
    an imperforate cover spaced above said nesting table a distance slightly greater than the height of said articles and extending longitudinally from said upstream location to a point which is upstream from said downstream location and extending across a portion of said table so that a high pressure area is created under said cover which forms a first row of articles along one of said side edges, a second row of articles along the other of said side edges and a third row of articles in the space between the first and second row of articles, the third row of articles being urged toward the second row of articles into nesting relationship by the high pressure wherein said cover extends laterally from one of said side edges toward the other of said side edges and is spaced from said other side edge a distance approximately equal to two article diamters; and
    means located downstream of said cover and upstream of said downstream location for converging and holding the articles in a contiguous nesting equilateral triangular configuration at said downstream location.

7. Apparatus, as claimed in claim 6, wherein said means for converging includes:
    converging side guides downstream of said cover.

8. Apparatus, as claimed in claim 6, further including:
    a second cover extending laterally from said other side edge to a point spaced from said cover to form a slot therebetween.

9. Air operated handling apparatus for nesting cylindrical articles which are conveyed en mass from a first upsteam location to a second downstream location in a three row width having an equilateral triangular configuration in which all articles are contiguous, said apparatus comprising:
    a nesting table extending from said upstream location to said downstream location and having a surface, two parallel side edges and an underside with a prearranged pattern of flotation air jets in said surface slanted in a downstream direction and communicating said surface and said underside of said table, said side edges being spaced apart a distance which is greater than three articles diameters;

a plenum connectable to a source of air under pressure and attached to the underside of said table surface;

spaced side guides along each side edge through which air from the air jets can escape;

an imperforate cover spaced above said nesting table a distance slightly greater than the height of said articles and extending longitudinally from said upstream location to a point which is upstream from said downstream location and extending across a portion of said table so that a high pressure area is created under said cover which forms a first row of articles along one of said side edges, a second row of articles along the other of said side edges and a third row of articles in the space between the first and second row of articles, the third row of articles being urged toward the second row of articles into nesting relationship by the high pressure, wherein said cover extends laterally from one side edge to the opposite side edge and further includes converging downstream edges which come together at a point at the center of said table; and means located downstream of said cover and upstream of said downstream location for converging and holding the articles in a contiguous nesting equilateral triangular configuration at said downstream location.

10. A method for tightly nesting vertical cylindrical articles received from a mass air conveyor into a three row, contiguous equilateral triangular configuration as they are transported from a mass air conveyor at an upstream location to a down stream location, said method comprising the steps of:

providing a nesting table between the mass air conveyor and the downstream location which has a center line, a surface, parallel side edges spaced apart a distance which is greater than three article diameters, but less than four article diameters, and an underside with a prearranged pattern of flotation air jets in the surface slanted in a downstream direction and communicating the surface with a source of air pressure to move the articles from the upstream location to the downstream location;

creating a high pressure area above the nesting table, wherein the high pressure is greater to one side of the center line than the other side, to cause articles arriving at the upstream location to separate into two single file rows of articles, one along each side edge;

filing in the space between the two rows of articles with a third row of articles;

using the high pressure area to force the third row of articles into nesting relationship against one of the other two rows of articles; and converging the three rows of articles at a location downstream of the high pressure area into nesting contiguous equilateral triangular configuration.

11. A method, as claimed in claim 10, including the further step of:

moving the articles in the nesting contiguous equilateral triangular configuration onto a deadplate.

12. A method for tightly nesting vertical cylindrical articles received from a mass air conveyor into a three row, contiguous equilateral triangular configuration as they are transported from a mass air conveyor at an upstream location to a down stream location, said method comprising the steps of:

providing a nesting table between the mass air conveyor and the downstream location which has a center line, a surface, parallel side edges spaced apart a distance which is greater than three article diameters, but less than four article diameters, and an underside with a prearranged pattern of flotation air jets in the surface slanted in a downstream direction and communicating the surface with a source of air pressure to move the articles from the upstream location to the downstream location;

creating a high pressure area above the nesting table, wherein the high pressure is greater along the center line than on either side of the center line to cause articles arriving at the upstream location to separate into two single file rows of articles, one along each side edge;

filing in the space between the two rows of articles with a third row of articles;

using the high pressure area to force the third row of articles into nesting relationship against one of the other two rows of articles; and converging the three rows of articles at a location downstream of the high pressure area into nesting contiguous equilateral triangular configuration.

* * * * *